(12) United States Patent
Larsson et al.

(10) Patent No.: US 10,005,576 B2
(45) Date of Patent: Jun. 26, 2018

(54) APPARATUS AND METHOD FOR PLACING A SCOOP IN A CONTAINER

(75) Inventors: Lennart Larsson, Malmö (SE); Per Hagelqvist, Lund (SE); Per Rasmusson, Helsingborg (SE)

(73) Assignee: A&R CARTON LUND AB, Lund (SE)

( * ) Notice: Subject to any disclaimer, the term of this patent is extended or adjusted under 35 U.S.C. 154(b) by 874 days.

(21) Appl. No.: 14/373,285

(22) PCT Filed: Jan. 20, 2012

(86) PCT No.: PCT/SE2012/050045
§ 371 (c)(1),
(2), (4) Date: Nov. 20, 2014

(87) PCT Pub. No.: WO2013/109175
PCT Pub. Date: Jul. 25, 2013

(65) Prior Publication Data
US 2015/0158610 A1    Jun. 11, 2015

(51) Int. Cl.
*B65B 35/18*    (2006.01)
*B65B 35/02*    (2006.01)
(Continued)

(52) U.S. Cl.
CPC .............. *B65B 35/18* (2013.01); *B65B 35/02* (2013.01); *B65B 35/16* (2013.01); *B65B 61/20* (2013.01); *G01F 19/002* (2013.01)

(58) Field of Classification Search
CPC ......... B65B 35/18; B65B 35/02; B65B 35/16; B65B 61/20; G01F 19/002
(Continued)

(56) References Cited

U.S. PATENT DOCUMENTS 1,834,085 A * 12/1931 Bloom ................. A47G 19/186
                                                        206/229
1,855,675 A * 4/1932 Hoffmeister ............ B65B 25/04
                                                        141/249
(Continued)

FOREIGN PATENT DOCUMENTS

DE    8412326 U1    8/1994
DE    8412326 U1    7/2014
(Continued)

OTHER PUBLICATIONS

International Search Report and Written Opinion for PCT:SE2012:050045, dated Dec. 3, 2012.
(Continued)

*Primary Examiner* — Hemant M Desai
*Assistant Examiner* — Lucas Palmer
(74) *Attorney, Agent, or Firm* — Brinks Gilson & Lione

(57) ABSTRACT

The invention concerns an apparatus for automatically placing a scoop in a container, where the apparatus comprises a scoop supply unit adapted to supply scoops to a release position of the scoop supply unit in a hanging manner, a first gripping device configured to grip an individual scoop at the release position of the supply unit and to move the scoop to a delivery position where the scoop is released from the gripping device in order to place the scoop in a container, where the supply unit comprises two sets of reciprocating holding fingers adapted to release one scoop at a time in the release position, where the gripping device comprises two gripping fingers having a semi-circular shape corresponding to the shape of the scoop, such that the inner sides of the gripping fingers bears on the rim of the scoop. The invention also concerns a method for automatically placing a scoop in a container. The advantage of the inventive apparatus is that
(Continued)

one scoop at the time can be picked up and placed in a container in a secure way.

21 Claims, 7 Drawing Sheets

(51) Int. Cl.
*G01F 19/00* (2006.01)
*B65B 35/16* (2006.01)
*B65B 61/20* (2006.01)

(58) Field of Classification Search
USPC ......... 53/473, 287, 300, 301, 307, 309, 312, 53/236, 250, 235, 467, 253, 255; 221/163, 164, 165, 166; 198/468.6, 198/468.8, 468.9
See application file for complete search history.

(56) References Cited

U.S. PATENT DOCUMENTS

| | | | | |
|---|---|---|---|---|
| 1,986,505 A * | 1/1935 | Fischer | ............ | B67B 3/14 53/137.1 |
| 1,989,039 A * | 1/1935 | Geyer | ............ | B65B 7/2807 198/345.1 |
| 2,082,048 A * | 6/1937 | Everett | ............ | B67B 3/2033 221/298 |
| 2,119,358 A * | 5/1938 | Scharf | ............ | B65B 51/14 53/374.8 |
| 2,175,255 A * | 10/1939 | Chapman | ............ | B65B 43/52 198/467.1 |
| 2,175,735 A * | 10/1939 | Banks | ............ | A47G 19/186 141/112 |
| 2,246,243 A * | 6/1941 | Clark | ............ | B65B 11/46 53/221 |
| 2,539,467 A * | 1/1951 | Pechy | ............ | B65B 7/2807 414/797.7 |
| 2,556,214 A * | 6/1951 | Pottle | ............ | B65B 35/50 235/98 R |
| 2,563,728 A * | 8/1951 | Kulpinski | ............ | B65B 61/20 221/209 |
| 2,705,857 A * | 4/1955 | Fox | ............ | A23G 3/0289 425/126.2 |
| 2,717,730 A * | 9/1955 | Blann | ............ | B65B 7/28 221/210 |
| 2,729,379 A * | 1/1956 | Wilcox | ............ | B67B 3/02 198/614 |
| 2,860,760 A * | 11/1958 | Yeo | ............ | B65G 47/1407 198/468.4 |
| 3,053,400 A * | 9/1962 | Erickson | ............ | B29D 30/0016 198/340 |
| 3,126,127 A * | 3/1964 | Lovendusky | ............ | B65G 47/1485 221/210 |
| 3,143,217 A * | 8/1964 | Andersen | ............ | B65G 25/02 198/468.2 |
| 3,144,148 A * | 8/1964 | Merkner | ............ | B65B 21/12 294/98.1 |
| 3,175,702 A * | 3/1965 | Banyas | ............ | C03B 35/125 198/476.1 |
| 3,178,217 A * | 4/1965 | Bargel | ............ | B65B 21/12 294/119.3 |
| 3,212,620 A * | 10/1965 | Adams | ............ | H01J 9/46 198/463.6 |
| 3,340,591 A * | 9/1967 | Fisher | ............ | B65C 3/18 156/DIG. 14 |
| 3,374,605 A * | 3/1968 | Satchwell | ............ | B67B 3/06 221/278 |
| 3,407,563 A * | 10/1968 | Dieter | ............ | B65B 17/025 53/138.1 |
| 3,415,034 A * | 12/1968 | Schmitt | ............ | B65D 69/00 206/515 |
| 3,431,695 A * | 3/1969 | Earling | ............ | A23G 9/265 227/131 |
| 3,435,586 A * | 4/1969 | Scherr | ............ | B65H 67/066 53/142 |
| 3,458,970 A * | 8/1969 | Draper | ............ | A21C 9/08 198/437 |
| 3,466,833 A * | 9/1969 | Penrod | ............ | B65B 5/06 53/153 |
| 3,570,647 A * | 3/1971 | Meikle | ............ | B21D 43/006 198/430 |
| 3,626,657 A * | 12/1971 | Heisler | ............ | B65B 27/10 100/14 |
| 3,804,270 A * | 4/1974 | Michaud | ............ | B25J 19/023 209/564 |
| 3,885,825 A * | 5/1975 | Amberg | ............ | B29C 63/426 198/377.07 |
| 3,901,180 A * | 8/1975 | Allen | ............ | B05C 19/02 118/421 |
| 3,987,605 A * | 10/1976 | Johnson | ............ | B65B 11/34 53/234 |
| 4,091,915 A * | 5/1978 | Claasen | ............ | B65B 35/56 198/389 |
| 4,105,384 A * | 8/1978 | Morch | ............ | A23G 9/265 425/126.2 |
| 4,215,460 A * | 8/1980 | Amberg | ............ | B29C 63/423 156/86 |
| 4,384,915 A * | 5/1983 | Utsumi | ............ | B29C 65/18 156/499 |
| 4,386,490 A * | 6/1983 | Griffith | ............ | B65B 35/405 53/148 |
| 4,440,101 A * | 4/1984 | Edwards | ............ | A01C 11/025 111/105 |
| 4,478,024 A * | 10/1984 | Vedvik | ............ | B65B 35/16 53/247 |
| 4,562,684 A * | 1/1986 | Dreher | ............ | B29C 63/423 29/775 |
| 4,574,558 A * | 3/1986 | Utsumi | ............ | B65G 47/848 198/339.1 |
| 4,584,819 A * | 4/1986 | Hakansson | ............ | B65B 61/205 53/133.1 |
| 4,597,704 A * | 7/1986 | Vedvik | ............ | B65B 35/16 198/434 |
| 4,614,074 A * | 9/1986 | Evers | ............ | B65B 61/205 294/86.4 |
| 4,639,180 A * | 1/1987 | Cucchi | ............ | B23Q 7/106 198/463.5 |
| 4,795,023 A * | 1/1989 | Gibbemeyer | ............ | B29C 49/4205 198/468.6 |
| 4,814,134 A * | 3/1989 | Brown | ............ | B29C 45/42 264/297.8 |
| 4,827,692 A * | 5/1989 | Fiske | ............ | B65B 5/06 53/244 |
| 4,903,458 A * | 2/1990 | Hakansson | ............ | B65D 77/28 156/443 |
| 4,938,338 A * | 7/1990 | Crawford | ............ | B65G 47/841 198/408 |
| 4,976,597 A * | 12/1990 | Schultz | ............ | A23G 9/265 221/116 |
| 4,977,727 A * | 12/1990 | Milleson | ............ | B65B 35/36 53/247 |
| 5,019,112 A * | 5/1991 | Engelhardt | ............ | B65B 5/067 53/155 |
| 5,061,144 A * | 10/1991 | Akimoto | ............ | G03F 7/26 118/500 |
| 5,067,304 A * | 11/1991 | Kuethe | ............ | B65B 61/202 53/133.1 |
| 5,095,681 A * | 3/1992 | Choi | ............ | B67B 3/22 198/394 |
| 5,161,691 A * | 11/1992 | Vulliez | ............ | A47G 21/02 206/542 |
| 5,228,266 A * | 7/1993 | Focke | ............ | B65B 51/026 493/132 |
| 5,236,022 A * | 8/1993 | Husted | ............ | A47G 19/34 141/108 |
| 5,237,801 A * | 8/1993 | Hillam | ............ | B65B 35/44 53/142 |
| 5,438,814 A * | 8/1995 | Lovett | ............ | B65B 7/2842 53/282 |

(56) References Cited

U.S. PATENT DOCUMENTS

| | | | | |
|---|---|---|---|---|
| 5,611,193 | A * | 3/1997 | Farrelly | B65B 5/105 53/245 |
| 5,816,030 | A * | 10/1998 | Carlberg | B65B 19/34 53/236 |
| 6,023,913 | A * | 2/2000 | Gray | B65B 11/105 53/154 |
| 6,038,832 | A * | 3/2000 | Focke | B65B 11/58 53/234 |
| 6,202,387 | B1 * | 3/2001 | Brown | B65B 11/105 156/538 |
| 6,371,717 | B1 * | 4/2002 | Grams | B25J 15/0052 294/81.61 |
| 6,399,901 | B1 * | 6/2002 | Nishino | B65B 3/28 141/372 |
| 6,835,042 | B2 * | 12/2004 | de Koning | B25J 9/0093 225/101 |
| 6,845,601 | B1 * | 1/2005 | Linner | B65B 35/38 198/409 |
| 7,073,312 | B2 * | 7/2006 | Battisti | B65B 35/38 198/468.3 |
| 7,412,808 | B2 * | 8/2008 | Lavi | B65B 11/56 53/155 |
| 7,513,089 | B2 * | 4/2009 | Rubin | B65B 11/00 221/123 |
| 7,552,570 | B2 * | 6/2009 | Raudat | B65B 21/06 53/235 |
| 7,717,255 | B2 * | 5/2010 | Scott | B66C 3/20 198/468.2 |
| 7,730,699 | B2 * | 6/2010 | Asma | B65B 11/34 53/234 |
| 8,020,690 | B2 * | 9/2011 | Asma | A23G 3/125 198/470.1 |
| 8,397,476 | B2 * | 3/2013 | Van Rens | B29C 65/18 53/329.2 |
| 8,413,799 | B2 * | 4/2013 | Bodtlander | B65G 29/00 198/470.1 |
| 9,560,920 | B2 * | 2/2017 | Oakes | A47F 1/125 |
| 2002/0124534 | A1 * | 9/2002 | Heisey | B65B 11/105 53/466 |
| 2005/0011730 | A1 * | 1/2005 | Wittmann | B65G 47/847 198/470.1 |
| 2005/0034424 | A1 * | 2/2005 | Di Stasio | B65B 21/18 53/247 |
| 2006/0260522 | A1 * | 11/2006 | Fountain | A01C 11/025 111/105 |
| 2007/0125442 | A1 * | 6/2007 | Tribble | B65B 3/003 141/27 |
| 2008/0041861 | A1 * | 2/2008 | Crawford | B65D 21/022 220/697 |
| 2009/0108025 | A1 * | 4/2009 | deVirag | G01F 11/086 222/205 |
| 2009/0183798 | A1 * | 7/2009 | Till | B65G 47/847 141/148 |
| 2009/0277132 | A1 * | 11/2009 | Nakajima | B65B 1/32 53/167 |
| 2012/0031043 | A1 * | 2/2012 | Yuyama | B65B 5/103 53/167 |
| 2012/0205376 | A1 * | 8/2012 | Yang | B65D 51/246 220/212 |
| 2013/0118130 | A1 * | 5/2013 | Visser | B65B 5/108 53/473 |
| 2015/0121815 | A1 * | 5/2015 | Larsson | B65D 51/246 53/471 |
| 2015/0158610 | A1 * | 6/2015 | Larsson | B65B 35/16 53/473 |

FOREIGN PATENT DOCUMENTS

| | | | |
|---|---|---|---|
| JP | 1254526 A | | 10/1989 |
| JP | 2898962 B1 | * | 6/1999 |
| JP | 11314618 A | | 11/1999 |
| JP | H11348926 | | 12/1999 |
| JP | 2001354214 A | | 12/2001 |
| JP | 2008120400 A | | 5/2008 |
| JP | 2011131929 | | 7/2011 |
| JP | 2011131929 A | * | 7/2011 |
| JP | 1254526 A | | 7/2014 |

OTHER PUBLICATIONS

Supplementary European Search Report for Application No. 12865989.3, Completed Jul. 17, 2015.

Office Action for Japanese Application No. 2014-553275, dated Mar. 14, 2016.

* cited by examiner

APPARATUS AND METHOD FOR PLACING A SCOOP IN A CONTAINER

RELATED APPLICATIONS

This application claims the benefit under 35 U.S.C. § 371 of International Patent Application No. PCT/SE2012/050045, having an international filing date of Jan. 20, 2012, the content of which is incorporated herein by reference in its entirety.

TECHNICAL FIELD

This invention relates to an apparatus and method for placing a scoop in a container before a lid is attached to the container.

BACKGROUND OF THE INVENTION

Today, there exist various solutions of automatically providing an individual additional item such as a scoop to a container and then applying a lid to the container.

In a known solution of automatically providing individual additional items to containers and then applying lids to these containers, the individual additional item is first placed within a container by dropping it into the container at a first manufacturing process step and thereafter the lid is applied to the container at a second manufacturing step, wherein each container is supplied to and from the first and second manufacturing step by means of a conveyor, e.g. a conveyor belt or conveyor chain. An important issue in this context is the production rate, i.e. the number of containers per a time period that can be supplied with both the individual additional item and the lid. To be commercially successful, the apparatus used for applying the individual additional item and the lid must allow for a high production rate. A problem when trying to increase the production rate when using this known solution is that due to the relatively high supply speed of the containers, the individual additional item may miss the opening of the container when it is dropped, which may cause the additional item to rest across the edges of the container or to end up outside of the container before the lid is applied the container. This in turn will result in no individual additional item within the sealed container or a damaged individual additional item and possibly a damaged lid and/or a damaged container. It is thus important that the additional item can be placed in the container in a fast and reliable way. The additional item can be placed directly in the container, i.e. in the content of the container, or can be placed on an inner lid, e.g. a sealing foil.

In another known method for applying an additional item, e.g. a spoon, to a container, the spoon is glued to the lid of the container before the lid is attached to the container. In this method, the spoon is glued to the lid in a separate production stage by using hot melt glue. The use of hot melt glue requires a separate production since the glue must cool off some before the lid can be applied to the container. When the container is provided with a separate, inner lid, usually a thin foil that conceals the inner of the container in an air tight way, it is also possible to glue the spoon to the inner lid. The glue could however loosen from the foil when the container is opened and could thus fall into the container and contaminate the product in the container.

It would also be possible to attach the additional item to the lid when the lid is produced, and to apply the lid with the additional item in the same stage, when the lid is applied. The stacking of the lids will however be difficult, especially when the additional item is e.g. a scoop that extends out from the underside of the lid.

JP11314618 discloses a device in which an indication description and a spoon are placed on an internal lid of a can. The device comprises a spoon suction part and an indication-description suction part. In this way, the description can be bent by the spoon, and the spoon and the description are integrated and placed on an internal lid, which allows for a more efficient device.

EP0358617 discloses a method and apparatus for applying glue on separate lids and attaching said lids to containers. The lid is collected in a first stage, glue is applied to the edge of the lid by rotating the lid in a second stage and the lid is applied to the container opening in a final mounting stage.

These solutions may work fine in some systems. There is however still room for an improved apparatus and method for placing a scoop in a container.

SUMMARY OF THE INVENTION

An object of the invention is therefore to provide an improved apparatus for placing a scoop in a container. A further object of the invention is to provide an improved method for placing a scoop in a container.

The solution to the problem according to the invention is described in the characterizing part of claim 1 for the apparatus and in claim 12 for the method. The other claims contain advantageous further developments of the inventive method and apparatus.

In an apparatus for automatically placing a scoop in a container, where said apparatus comprises a scoop supply unit adapted to supply scoops to a release position of the scoop supply unit, a first moveable gripping device configured to grip an individual scoop at the release position of the supply unit and to move the scoop to a delivery position where the scoop is released from the gripping device in order to place the scoop in a container, the object of the invention is achieved in that the supply unit comprises two rails spaced apart such that the scoop can be forwarded on the rails in a hanging manner with the handle of the scoop pointing downwards, that the supply unit comprises two sets of reciprocating holding fingers adapted to release one scoop at a time in the release position, that the gripping device comprises two gripping fingers adapted to grip the scoop, where each gripping finger is provided with a semi-circular shape corresponding to the shape of the cup-shaped part of the scoop, such that the inner sides of the gripping fingers bears on the rim of the scoop.

By this first embodiment of the inventive apparatus, a scoop can be placed in a container before the lid is attached to the container. One advantage of the apparatus is that the apparatus ensures that only one scoop at the time is picked up by the gripping device. The gripping device will then move the scoop to a delivery position in which the scoop can be placed in the container in a secure and reliable way. In this way, a high throughput can be realized. The scoop can be placed in the container before the container reaches the lid attachment station, or can be placed in the container at the lid attachment station. This improves the efficiency, reliability and the production rate for placing a scoop in a container. By placing the scoop directly in the container, there is no need to attach the scoop to the lid before or after the lid is attached to the container. Handling of the lids, since the lids can be stored in a regular way, without any additional items attached to the lids during storage of the lids. This simplifies the storage and handling of the lids.

In an advantageous development of the inventive apparatus, the inner sides of the gripping fingers are provided with an inclination such that the diameter of the semicircular shape at the front side is smaller than the diameter at the rear side. The scoop will thus be clamped between the griping fingers at the front part of the gripping fingers. By providing the gripping fingers with a larger diameter at the rear, a funnel shape is provided which helps to guide the scoop into the gripping device. By holding the scoop only at the front part of the rim, scoops with differently inclined and shaped walls of the cup-shaped part can be held by the same gripping fingers without damaging the outside of the scoop.

In an advantageous development of the inventive apparatus, the outer ends of the gripping fingers are provided with a cut-out between a front flange and a rear flange, adapted to hold the upper region of the handle of the scoop. In this way, the scoop can be held both by the rim and by the handle, which gives a more secure holding of the scoop. The handle will fit between the flanges of the cut-out which provides a secure holding of the scoop in a forward and backward way, such that the scoop cannot escape the gripping fingers. This allows for an accurate positioning of the scoop in the container. The front flange and the rear flange may also be adapted to fit corresponding recesses in the handle of the scoop. In this way, the gripping fingers must not be wider than the handle of the scoop. Further, different scoops can be held by the same gripping fingers as long as the handles are provided with recesses adapted for the cut-out.

In an advantageous development of the inventive apparatus, the first gripping device is configured to transfer the scoop in a substantially horizontal manner before the scoop is released. In this way, the gripping device will grip the scoop at a position on the side of the container conveyor and will move the scoop to a position above the container opening, where the spoon is released. This allows for a simple and reliable placing of scoops in containers.

In an advantageous development of the inventive apparatus, the first gripping device is configured to transfer the scoop also in a substantially vertical manner before the scoop is released. In this way, the gripping device can grip the scoop at a position on the side of and above the container conveyor and can move the scoop down to the container opening, where the scoop can be released in a reliable way.

In an advantageous development of the inventive apparatus, the apparatus further comprises a second gripping device, which is configured to grip the scoop from the first gripping device and to transfer the scoop to the opening of the container. In this way, a scoop can be placed in a container in a reliable and secure way.

In an advantageous development of the inventive apparatus, the second gripping device transfers the scoop downwards along a vertical shaft to the container. In this way, the scoop supply unit can be positioned above the container conveyor. This further allows for a compact apparatus.

In an advantageous development of the inventive apparatus, the second gripping device is configured to grip the scoop at the delivery position facing the first gripping device and to rotate the scoop to a second position facing the container. In this way, the scoop can be placed on an inner lid of the container. By rotating the scoop to the position in which it is to be placed on the inner lid, the scoop can be placed on the inner lid in a reliable and secure manner. There is thus no risk of the scoop falling off or being misaligned during the placing of the scoop.

In an advantageous development of the inventive apparatus, the second movable gripping device comprises a suction device configured to hold the individual additional item. In this way, the additional item is held in a secure way by the gripping device.

In a method for automatically placing a scoop in a container, the steps of feeding a scoop by a scoop supply unit to a release position of the scoop, where the scoop is positioned in a hanging manner with the handle pointing downwards, releasing one scoop by the use of two sets of reciprocating holding fingers provided in the scoop supply unit, gripping the scoop around the rim of the scoop by a first gripping device, and moving the scoop to a delivery position, where the scoop is released from the gripping device in order to place the scoop in a container are disclosed.

By this first embodiment of the method for placing a scoop in a container, the scoop is placed in the container in a reliable manner. The advantage of this is that the scoop is not misplaced or misaligned during the placing in the container.

In an advantageous development of the inventive method, the steps of transferring the scoop from the first gripping device to a second gripping device, moving the scoop by the second gripping device to the container, and releasing the scoop from the second gripping device are disclosed. This allows for a flexible production process.

In an advantageous development of the inventive method, the steps of rotating the scoop such that the open side of the cup-shaped part of the scoop is horizontal and placing the scoop on an inner lid of the container are disclosed. This allows for a reliable placing of scoops on containers having an inner lid.

Any of the advantageous features of the present invention above may be combined in any suitable way.

BRIEF DESCRIPTION OF DRAWINGS

The invention will be described in greater detail in the following, with reference to the attached drawings, in which FIG. 1 schematically shows in perspective view a pictorial representation of an apparatus for automatic placing of scoops in containers according to the invention.

DESCRIPTION OF EXAMPLE EMBODIMENTS OF THE INVENTION

The embodiments of the invention with further developments described in the following are to be regarded only as examples and are in no way to limit the scope of the protection provided by the patent claims.

The following examples of the present invention relate, in general, to the field of applying lids to containers and in particularly, to an apparatus and method for an automatic application of individual additional items to lids in the same manufacturing process step as when applying the lids to containers.

Examples of the present invention will be described more fully hereinafter with reference to the accompanying drawings, in which examples of the invention are shown. This invention may, however, be embodied in many different forms and should not be construed as limited to the examples set forth herein. Rather, these examples are provided so that this disclosure will be thorough and complete, and will fully convey the scope of the invention to those skilled in the art. Like reference signs refer to like elements throughout.

Figure 1:
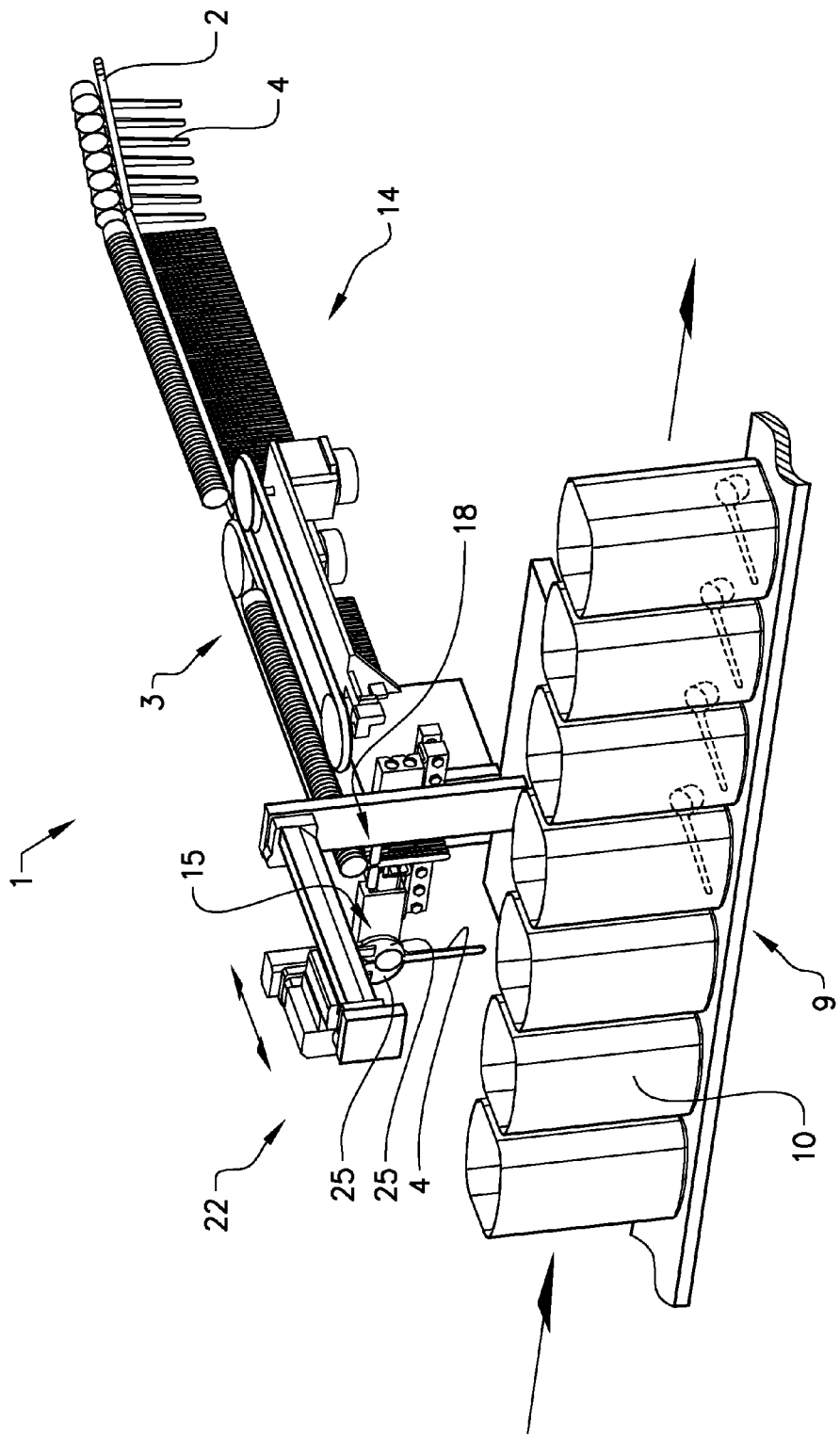
Figure 2:
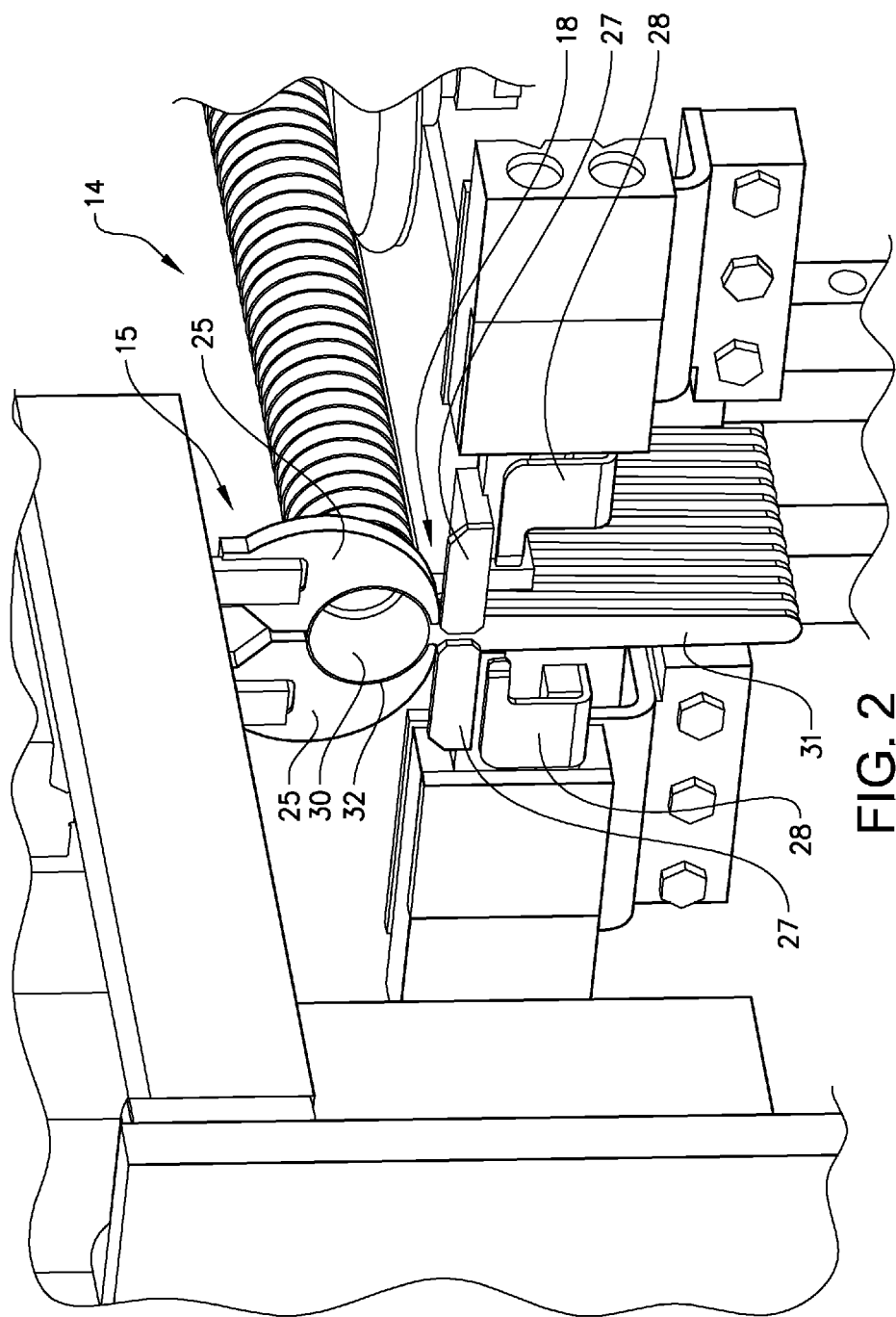
FIG. 2 shows the gripping device in the pick-up position of an apparatus according to the invention.

FIG. 1 show an inventive apparatus for automatic placing of scoops 4 in containers 10, where a scoop is placed in the container prior to attaching the lid to the container. The apparatus 1 comprises a scoop supply unit 14. The scoops 4 are forwarded by guiding rails 2 and a feeding device 3 to a pick-up position 18, where a hold and release mechanism ensures that only one scoop at a time is released. FIG. 2 shows the pick-up position with the gripping device 15 gripping a scoop. In this position, the gripping device 15 is in one of its end positions, where it will grip a scoop from the scoop supply unit. The hold and release mechanism comprises two sets of reciprocating holding fingers, an upper set of holding fingers 27 and a lower set of holding fingers 28, which ensures that only one scoop at a time is release. When a scoop is in the pick-up position, it bears on the upper set of holding fingers 27. In this way, the pick-up position ensures that the scoop is in a well defined delivery position.

Figure 5:
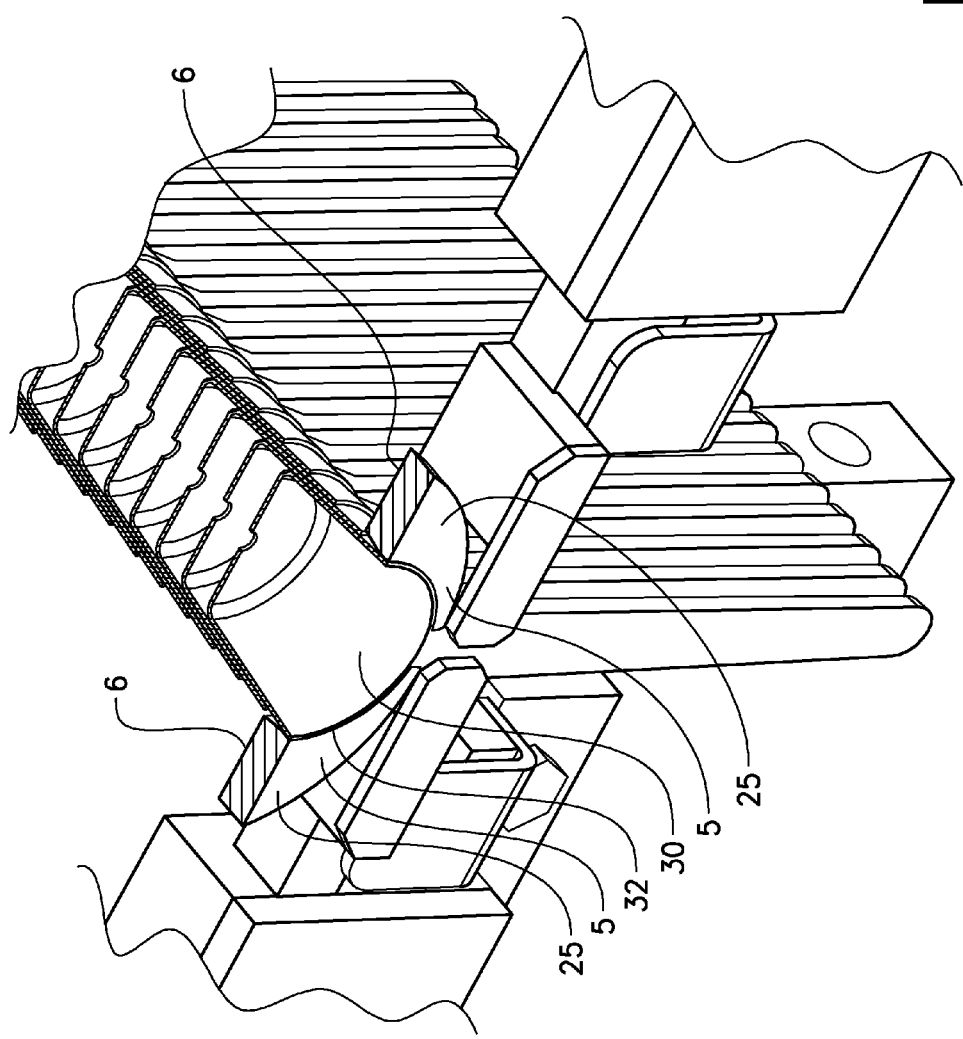
FIG. 5 shows a cut view of a gripping device in the pick-up position of an apparatus according to the invention.

The gripping device 15 grips a scoop 4 by the rim 32. The scoop comprises a cup-shaped part 30 with the rim 32 and an elongated handle 31. The gripping device comprises two gripping fingers 25 which are provided with a shape that corresponds to the shape of the scoop. In this example, the gripping fingers are shaped such that each gripping finger is provided with a semi-circular shape, such that the inner sides 26 of the gripping fingers bears on the rim of the scoop when the gripping fingers grip the scoop. The inner sides 26 of the gripping fingers may be provided with an inclination such that the diameter of the semi-circular shape at the front side 5 of the gripping fingers is smaller than the diameter at the rear side 6 of the gripping fingers, which can be seen in FIG. 5. The inclination may extend over the complete inner surface or over a circumferential part of the inner surface.

Figure 3:
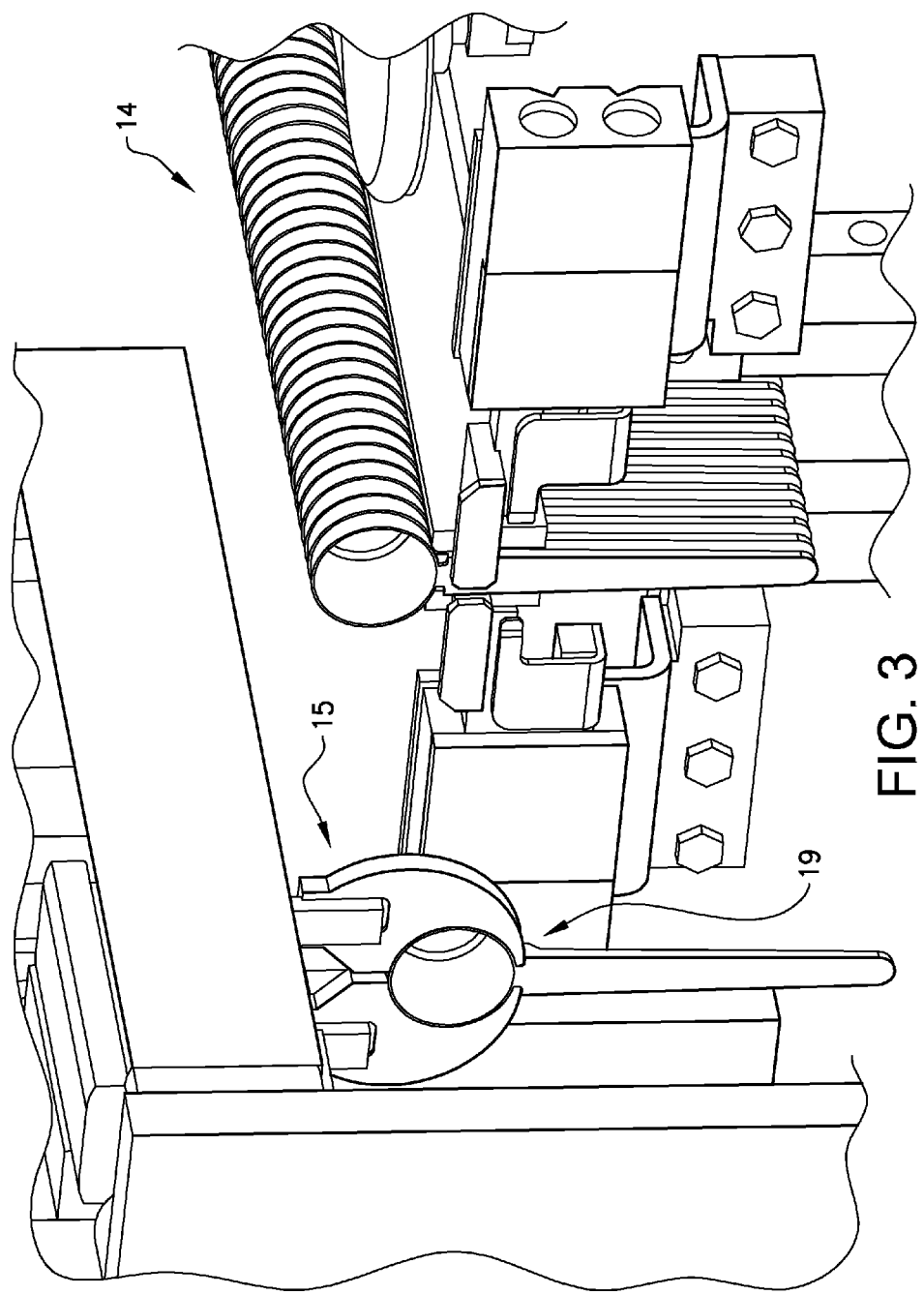
FIG. 3 shows the gripping device in a first delivery position of an apparatus according to the invention.

The hold and release mechanism releases the scoop from the pick-up position and the gripping device 15 moves to a first delivery position 19, which is shown in FIG. 3. The first delivery position is in a first example positioned just above a container opening, such that the scoop will fall down into the container when the gripping device is opened in the first delivery position. In this way, the handle will first enter into the container and, depending on the content in the container, will enter into the content or will lay on the content. It is also possible to let the gripping device move downwards, such that the handle of the scoop will be pushed into the content of the container. In this way, the scoop can be reliably placed also in a container that is relatively full with e.g. a powdery content. It is also possible to place the scoop in a container prior to the filling of the container.

Figure 4A:
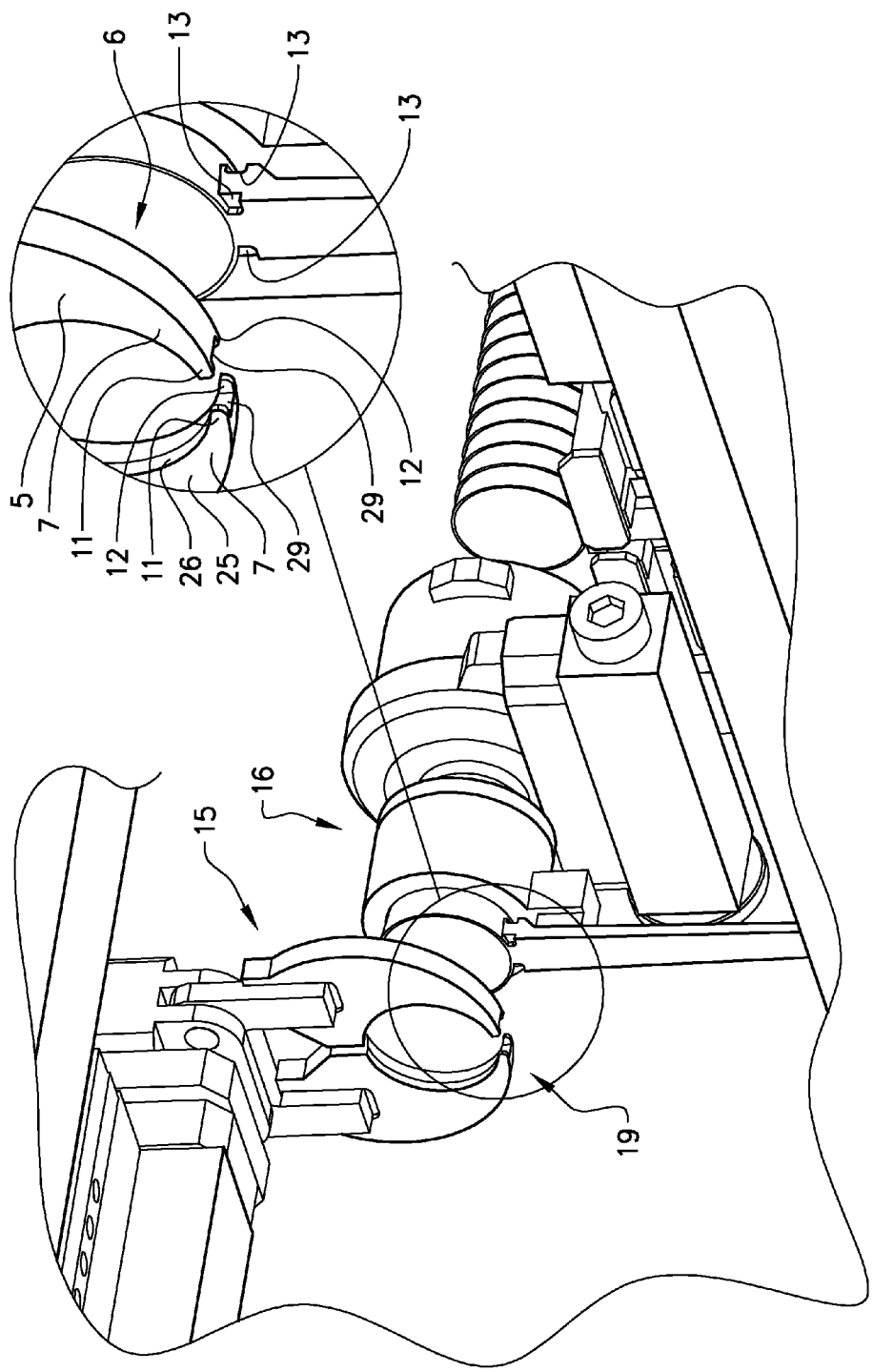
FIG. 4a-4c shows the second gripping device of an apparatus according to the invention.

Each gripping finger 25 may further be provided with a cut out 29 at the outer ends 7 of each finger, as shown in FIG. 4a. On each side of the cut out, a front flange 11 and a rear flange 12 extends. The cut out is adapted to the shape of the handle of the scoop in the region closest to the cup-shaped part, such that the gripping fingers 25 will also grip the scoop at the handle. In this way, the gripping fingers will hold the scoop in a secure way with the flanges supporting the handle at the front and rear side of the scoop. The flanges will secure that the scoop does not move forwards or rearwards in the gripping device, which allows for a more secure hold of the scoop than when the scoop is held only by the rim. By providing the scoop with recesses 13 corresponding to the flanges, the gripping fingers do not have to be wider than the handle. By providing the handle with recesses, differently sized handles can be gripped with the same gripping device.

In a development of the apparatus, a second gripping device 16 is comprised. The second gripping device is adapted to grip the scoop from the first gripping device 15 in the first release position 19 and to move the scoop to a second release position 20 where the scoop is placed in the container. When the scoop is held in the first release position by the gripping device 15, the second gripping device moves to a position next to the first gripping device and thus next to the scoop, where it will pick up the scoop from the first gripping device, as shown in FIG. 4a. The scoop is at the same time released from the first gripping device. The second gripping device is provided with a suction device 24 which holds the scoop. The scoop may be provided with one or more small holes that will allow even packed powder to release from the scoop, such that an under pressure is avoided in the scoop when a powdery product is to be released. The suction pressure of the suction device is preferably adapted to the area of the release holes and to the weight of the scoop.

Figure 4B:
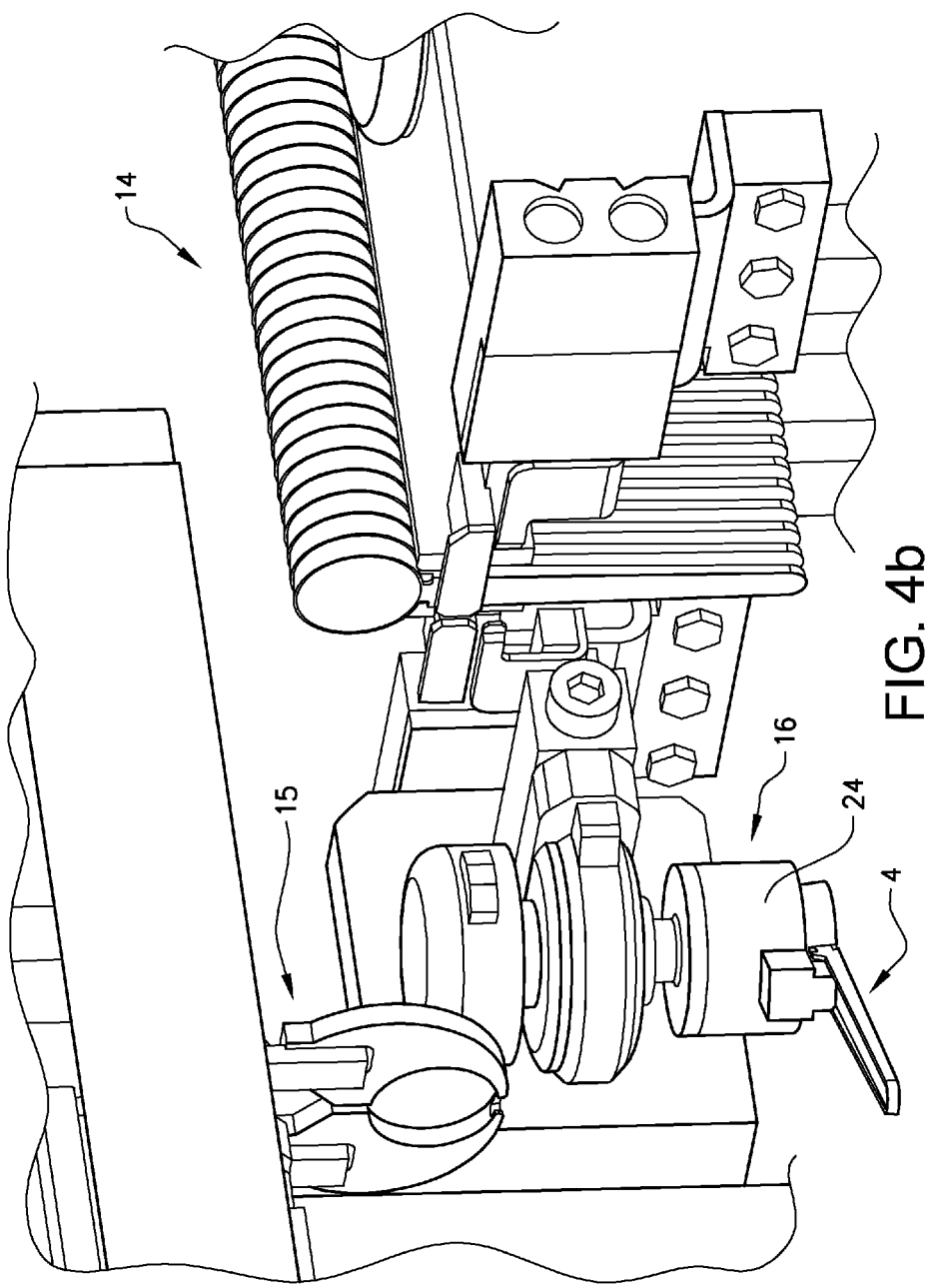
Figure 4C:
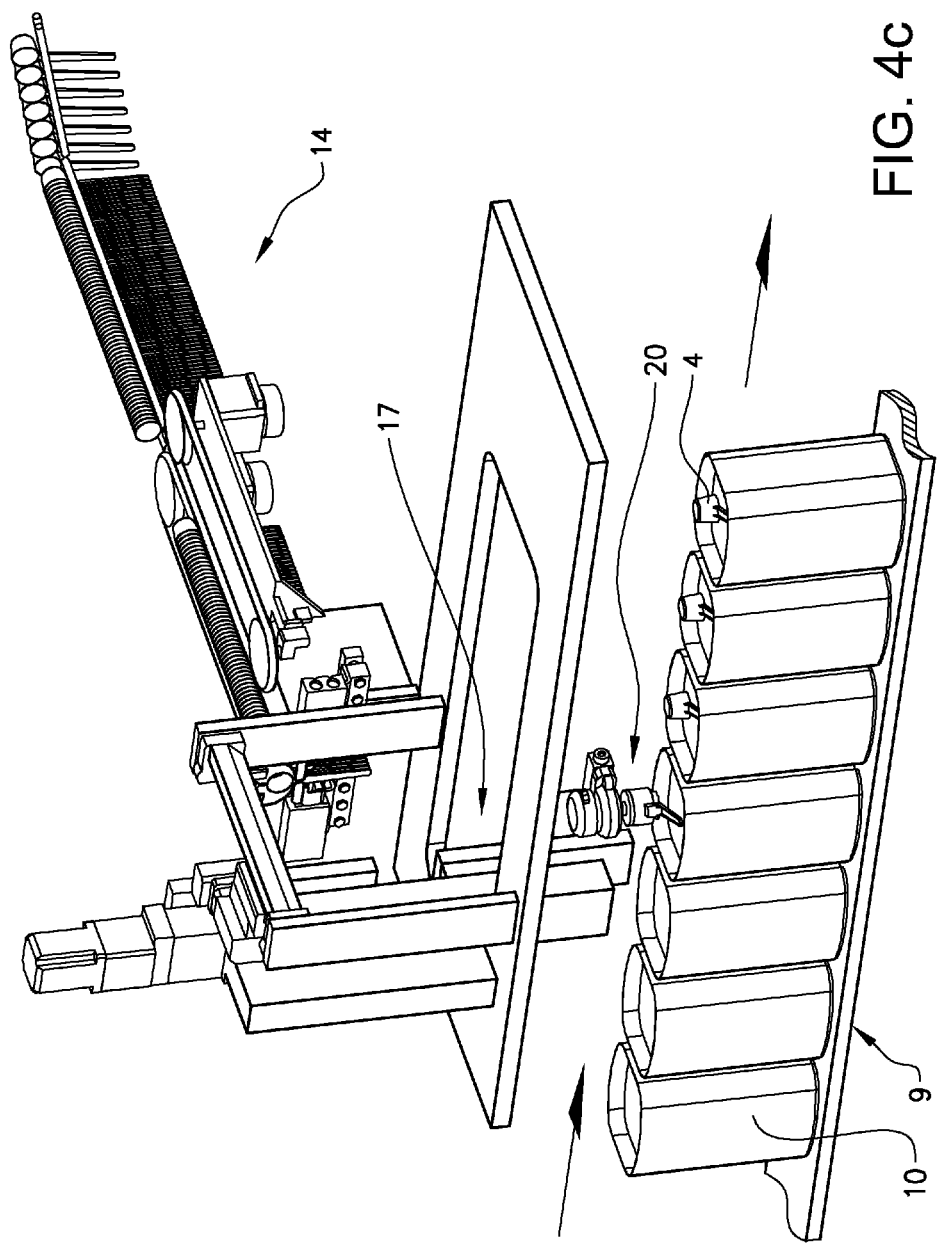

The second gripping device can be adapted to place the scoop in the container in different positions. In a first example, the second gripping device moves the scoop downwards along a vertical shaft 17 and releases the scoop in a container with the handle down, such that the handle enters the container first. In another example, the second gripping device tilts the scoop by 90 degrees such that the opening of the scoop is directed downwards, towards the container. At the same time, the second gripping device may also rotate the scoop such that the position corresponds to a desired placing position on an inner lid of the container, as is shown in FIG. 4b. When the scoop is in the proper position, the second gripping device will move downwards along the vertical shaft towards the container, to a second release position 20 where the second gripping device will place the scoop on the inner lid of the container in a reliable manner by releasing the suction pressure of the suction device, which is shown in FIG. 4c. The second gripping device may return to an idle position or may move upwards directly to pick up the next scoop from the first gripping device.

When the scoop is placed in the container, either in the container or on an inner lid of the container, the container is moved forwards by the conveyor 9 to a subsequent production station, e.g. a lid attachment station.

The invention is not to be regarded as being limited to the embodiments described above, a number of additional variants and modifications being possible within the scope of the subsequent patent claims.

REFERENCE SIGNS

1. Apparatus for automatically placing a scoop in a container
2: Rail
3: Feeding device
4: Scoop
5: Front side of gripping finger
6: Rear side of gripping finger
7: Outer end
9: Conveyor
10: Container
11: Front flange
12: Rear flange
13: Recess
14: Scoop supply unit
15: First gripping device
16: Second gripping device
17: Vertical shaft
18: Pick-up position
19: First delivery position
20: Second delivery position
24: Suction device 25: Gripping finger
26: Inner side
27: Upper reciprocating holding fingers
28: Lower reciprocating holding fingers
29: Cut out
30: Cup-shaped part
31: Elongated handle
32: Rim

The invention claimed is:

1. An apparatus for automatically placing a scoop in a container, where the scoop comprises a cup-shaped part and a handle, said apparatus comprises
a scoop supply unit adapted to supply scoops to a pick-up position of the scoop supply unit,
a first moveable gripping device configured to grip an individual scoop at the pick-up position of the supply unit and to move the scoop to a first delivery position where the scoop is released from the first gripping device in order to place the scoop in a container,
where the supply unit comprises two rails spaced apart such that the scoop can be forwarded on the rails in a hanging manner with the handle of the scoop pointing downwards,
where the supply unit comprises two sets of reciprocating holding fingers adapted to release one scoop at a time in the pick-up position, and
where the first gripping device comprises two gripping fingers adapted to grip the scoop, where each gripping finger is provided with a semi-circular shape corresponding to the shape of the cup-shaped part of the scoop, such that the inner sides of the gripping fingers bears on the rim of the cup-shaped part of the scoop.

2. The apparatus according to claim 1, wherein the inner surfaces of the two gripping fingers that contact the individual scoop are inclined such that a diameter of the semi-circular shape at a side furthest from the supply unit is smaller than a diameter of the semi-circular shape nearest the supply unit to facilitate guiding the scoop into the gripping device.

3. The apparatus according to claim 2, wherein the outer ends of the gripping fingers are provided with a cut-out between a front flange and a rear flange adapted to hold the upper region of the handle of the scoop.

4. The apparatus according to claim 2, wherein the first gripping device is configured to transfer the scoop in a substantially horizontal manner before the scoop is released.

5. The apparatus according to claim 2, wherein the apparatus further comprises a second, lower gripping device, wherein the second gripping device is configured to collect the scoop at the first delivery position of the first gripping device and to move the scoop to a second delivery position where the scoop is transferred to the container.

6. The apparatus according to claim 1, wherein end tips of the gripping fingers define a front flange, a rear flange, and a cut-out therebetween configured to hold the upper region of the handle of the scoop.

7. The apparatus according to claim 6, wherein the front flange and the rear flange are adapted to fit corresponding recesses in the handle of the scoop.

8. The apparatus according to claim 6, wherein the first gripping device is configured to transfer the scoop in a substantially horizontal manner before the scoop is released.

9. The Apparatus according to claim 6, wherein the apparatus comprises a scoop, wherein the scoop includes a cup-shaped part and an elongated handle, wherein the handle of the scoop is provided with recesses in the upper region of the handle, where the recesses corresponds to the flanges of the gripping fingers.

10. The apparatus according to claim 1, wherein the first gripping device is configured, in a first operation, to transfer the scoop in a substantially horizontal manner before the scoop is released.

11. The apparatus according to claim 10, wherein the first gripping device is configured, in a second operation, to transfer the scoop in a substantially vertical manner before the scoop is released.

12. The apparatus according to claim 1, wherein the apparatus further comprises a second, lower gripping device, wherein the second gripping device is configured to collect the scoop at the first delivery position of the first gripping device and to move the scoop to a second delivery position where the scoop is transferred to the container.

13. The apparatus according to claim 12, wherein the second gripping device moves the scoop downwards along a vertical shaft to the container.

14. The apparatus according to claim 13, wherein that the second gripping device is configured to grip the scoop at the first delivery position facing the first gripping device and to rotate the scoop to a second position facing the container.

15. The apparatus according to claim 13, wherein the second gripping device comprises a suction device configured to hold the scoop.

16. The apparatus according to claim 12, wherein the second gripping device is configured to grip the scoop at the first delivery position facing the first gripping device and to rotate the scoop to a second position facing the container.

17. The apparatus according to claim 12, wherein the second gripping device comprises a suction device configured to hold the scoop.

18. The apparatus according to claim 1, wherein the gripping fingers of the first gripping device extend in a direction parallel to a longitudinal direction of the handle of the individual scoop gripped within the gripping fingers.

19. A method for automatically placing a scoop in a container, comprising the steps of:
feeding a scoop by a scoop supply unit to a pick-up position of the scoop, where the scoop is positioned in a hanging manner with the handle pointing downwards;
releasing one scoop by the use of two sets of reciprocating holding fingers provided in the scoop supply unit;
gripping the scoop around a rim of the cup-shaped part of the scoop by a first gripping device;
moving the scoop to a first delivery position, where the scoop is released from the gripping device in order to place the scoop in a container.

20. The method according to claim 19, wherein the method further comprises the steps of:
transferring the scoop from the first gripping device to a second gripping device;
moving the scoop by the second gripping device to a second delivery position;
releasing the scoop from the second gripping device in order to place the scoop in the container.

21. The method according to claim 20, wherein the method further comprises the steps of:
rotating the scoop such that the open side of a cup-shaped part of the scoop is horizontal, pointing towards the container; and
placing the scoop on an inner lid of the container.

* * * * *